United States Patent [19]

Pierre et al.

[11] Patent Number: 5,372,044
[45] Date of Patent: Dec. 13, 1994

[54] OPTICAL SENSOR, ESPECIALLY PRESSURE SENSOR, AND CORRESPONDING OPTICAL MEASUREMENT PROCESS

[75] Inventors: Guillaume Pierre, Brunoy; Michel Jurczyszyn, Ivry; André Tardy, Egly, all of France

[73] Assignee: Framatome, Courbevoie, France

[21] Appl. No.: 846,881

[22] Filed: Mar. 6, 1992

[30] Foreign Application Priority Data

Mar. 7, 1991 [FR] France ............... 9102752

[51] Int. Cl.$^5$ ............................................. G01N 3/00
[52] U.S. Cl. ............................................. 73/800; 73/705
[58] Field of Search ............... 73/800, 705, 862.624, 73/115; 250/227.16; 356/32, 33, 35.5; 374/131

[56] References Cited

U.S. PATENT DOCUMENTS

| | | | |
|---|---|---|---|
| 3,204,463 | 9/1965 | Taber | 73/726 |
| 3,333,472 | 8/1967 | McLellan | 73/826 |
| 3,894,435 | 7/1975 | Shimada et al. | 73/115 |
| 4,163,397 | 8/1979 | Harmer | 356/32 |
| 4,342,907 | 8/1982 | Macedo et al. | |
| 4,545,253 | 10/1985 | Avicola | |
| 4,659,923 | 4/1987 | Hicks, Jr. | 73/705 |
| 4,933,545 | 6/1990 | Saaski et al. | 73/705 |

FOREIGN PATENT DOCUMENTS

| | | |
|---|---|---|
| 0393956 | 10/1990 | European Pat. Off. |
| 0029712 | 1/1989 | Japan ............... 250/227.16 |
| 8300744 | 3/1983 | WIPO |

Primary Examiner—Robert Raevis
Attorney, Agent, or Firm—Pollock, Vande Sande & Priddy

[57] ABSTRACT

The optical sensor includes a support (2), an optical fiber (15) and two elements (9, 10) mounted on the support (2) in such a manner as to move as a function of the variations of a quantity to be measured, such as pressure. The attenuation of an optical radiation in the optical fiber (15) deformed by reverse bending is measured. The support (2) is constructed in the form of a bending beam including two end parts (2b, 2c) bearing on two fixed abutments and a central part (2a) connected to a metal membrane (16) actuated as a function of the variations of the quantity to be measured. The optical fiber (15) is disposed between the two movable elements (9, 10) in the form of a comb, each fixed on an end part (2b, 2c) of the support. The elements (9, 10) include active surfaces coming into contact with the fiber (15) to produce a variable reverse bending of the fiber (15) in the course of their relative movement.

2 Claims, 2 Drawing Sheets

OPTICAL SENSOR, ESPECIALLY PRESSURE SENSOR, AND CORRESPONDING OPTICAL MEASUREMENT PROCESS

FIELD OF THE INVENTION

The invention relates to an optical sensor and, especially, a pressure or differential pressure sensor.

BACKGROUND OF THE INVENTION

In the case where it is necessary to make measurements of physical parameters, such as the pressure of a fluid, in an explosive environment or in a zone in which the measurements run the risk of undergoing disturbances of electromagnetic origin, it may be desirable to make these measurements by optical means, in order to avoid using an electric current.

To make these measurements, use is made of optical sensors which execute a modulation or an attenuation of an optical radiation penetrating the sensor, as a function of the variations of the quantity to be measured.

Optical sensors are known, in particular, which include a support, an optical fiber and at least one element mounted on the support which is capable of moving on the support as a function of the variations of the physical quantity to be measured. The movements of the movable element, which includes an active surface in contact with a generatrix of the optical fiber of undulated form, permit the deformation of the optical fiber by reverse bending, with an amplitude which is a function of the instantaneous value of the physical quantity to be measured.

The optical fiber is fed at one of its ends in such a manner as to cause the propagation of optical radiation along the length of the fiber, and the intensity of the optical radiation and its attenuation at the exit of the fiber are measured.

This attenuation is dependent upon the amplitude of the deformation of the fiber by reverse bending, and thus upon the value of the physical quantity to be measured.

The devices making use of this measurement principle generally include a support on which elements are fixed which are capable of moving relative to one another as a function of the variations of the physical quantity to be measured which may be, for example, a stress, a pressure or a temperature.

A strain gauge is known, for example, of optical type which includes two elements which may be fixed on the component in which the strains are measured, and which include pins between which an optical fiber is intercalated. When the component is deformed, the relative movement of the elements executes, via the a deformation of the fiber by reverse bending which permits the measurement of the amplitude of the deformations and thus of the strains in the component.

Also known is a device for measuring physical or mechanical quantities such as strains, temperatures or pressures, which includes a support on which elements are fixed for the deformation of an optical fiber including undulated surfaces in contact with two external generatrices of the fiber.

These known gauges or sensors of the prior art do not have a compact and stable structure permitting their use in an effective manner in an industrial installation. Moreover, the measurements made are liable to lack sensitivity and reproducibility, especially in the case of sensors employed for pressure measurements.

SUMMARY OF THE INVENTION

Accordingly, the object of the invention is provide an optical sensor, and especially a pressure sensor, of the type including a support, an optical fiber and at least one element mounted on the support in such a manner as to move as a function of the variations of a quantity to be measured and to deform the optical fiber by reverse bending, the fiber being fed with optical radiation, the attenuation of which is measured, this optical sensor being capable of being constructed in a simple, compact and steady form permitting its utilization in an industrial installation and in such a manner as to execute measurements of a physical parameter such as pressure with a high degree of sensitivity and reproducibility.

In order to achieve this object, the support is constructed in the form of a bending beam including two end parts bearing on two fixed abutments and a central part which is deformable by bending and which is connected to a bending means actuated as a function of the variations of the quantity to be measured, and the sensor includes two movable elements in the form of a comb, between which elements the optical fiber is disposed, each element being fixed on an end part of the support, in such a manner as to present two active parts, coming into contact with the fiber, which move relative to one another as a function of the bending of the beam, to produce a variable reverse bending of the fiber.

BRIEF DESCRIPTION OF THE DRAWINGS

In order to provide a good understanding of the invention, a description will now be given, by way of example and with reference to the accompanying drawings, of an embodiment of an optical sensor according to the invention and the utilization thereof for making pressure measurements.

DESCRIPTION OF PREFERRED EMBODIMENT

Figure 1:
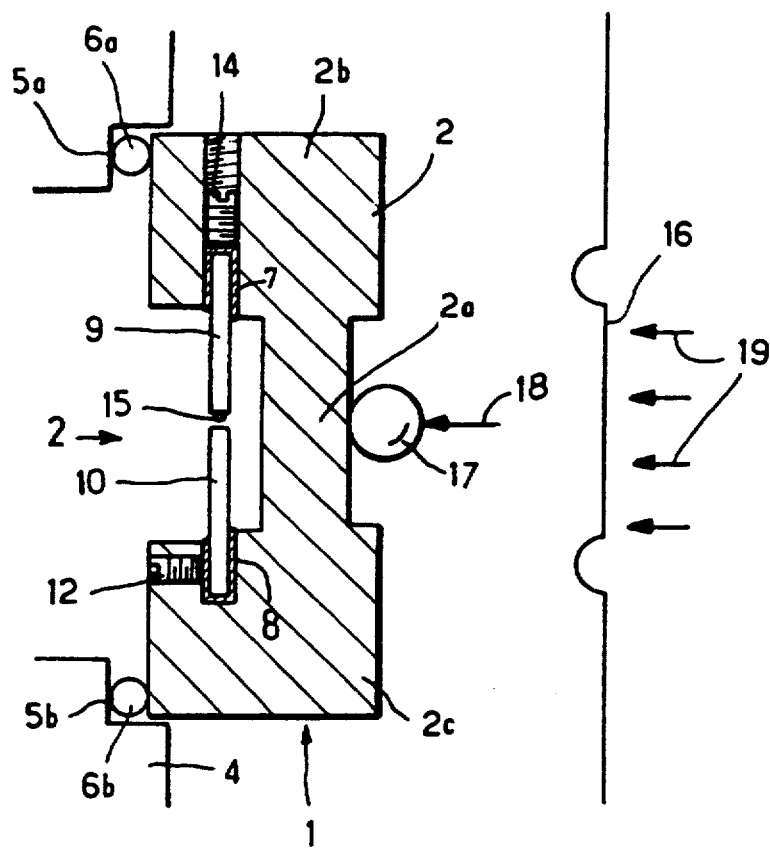
FIG. 1 is a cross-sectional view of a pressure sensor according to the invention.

FIG. 1 shows an optical pressure sensor 1, including a support 2 constructed in the form of a bending beam including a central part 2a and two end parts 2b and 2c thicker than central part 2a.

The support 2 of the sensor is mounted within a sensor body 4 including two recesses 5a and 5b within each one of which an abutment, 6a and 6b respectively, is mounted.

The end parts 2b and 2c of the support 2 of the sensor are fixed so as to bear against the abutments 6a and 6b, respectively.

The end parts 2b and 2c of the support 2 have two opposite surfaces which are machined to constitute receiving recesses in the form of slits 7 and 8 for two elements 9, 10 constituted by plane metal plates.

The end part 2c of the support 2 includes a threaded aperture opening laterally into the recess 8, into which aperture a screw 12 is engaged for clamping and fixing the element 10.

The end part 2b of the support includes, in the extension of the slit 7, a threaded hole opening at its end into the recess 7. A screw 14 introduced into the threaded aperture permits adjustment of the position of the element 9 in the form of a plate, in the direction of the element 10 situated opposite.

Figure 2:
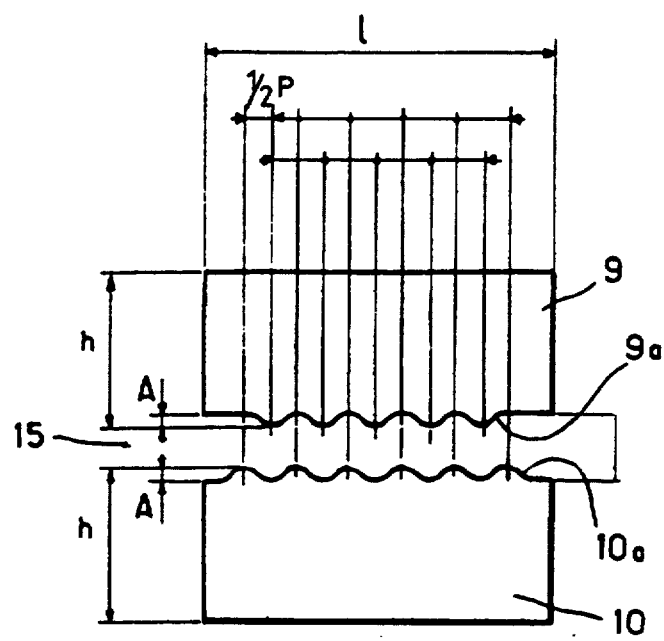
FIG. 2 is a front view in the direction of arrow 2 of FIG. 1, of the elements in the form of a comb of the sensor shown in FIG. 1.

As may be seen in FIG. 2, the elements 9 and 10 in the form of a plate include active surfaces, 9a and 10a respectively, of sinusoidal shape and disposed opposite one another, with an offset equal to one half-period.

An optical fiber 15 is intercalated between the active surfaces 9a and 9b of the elements 9 and 10 in such a manner as to come into contact with the sinusoidal surfaces 9a and 10a along two generatrices of its external surface.

The adjustment of the position of the element 9 by means of the screw 14 permits the optical fiber to contact surfaces 9a and 10a as well as a certain clamping of the optical fiber involving a deformation for reverse bending of this fiber between the successive undulations of the surfaces 9a and 10a.

In the construction of a pressure sensor according to the invention, use was made of two elements 9 and 10 in the form of a comb, which elements are constituted by plane plates having a width 1 of 10 mm, a height h of 5 mm and a thickness of 1 mm. The combs include active surfaces in the shape of sinusoids having a period P of which is 1.5 mm and an amplitude A of 0.1 mm.

The contacting of the sinusoidal active surfaces of these elements with a 100/140 μm multimode optical fiber permits microcurvatures of the fiber to be obtained.

The deformation of the fiber by microcurvature is regulated in such a manner that the amplitude of deformation is approximately 10 μm.

The period of the sinusoidal deformation profile of the fiber is selected in such a manner that this period is equal to the beat length between the modes of the fiber; this induces a coupling of energy from the guided modes to the non-guided modes of the fiber, and consequently an optical attenuation produced by the deformation.

The pressure sensor 1 shown in FIG. 1 includes a metal membrane 16 fixed on the sensor body 4, an abutment 17 bearing on the central part 2a of the support 2 opposite the elements 9 and 10 and the fiber 15 and a means, such as a rigid rod, permitting the transmission of the movements of the deformable membrane 16, for example under the effect of external pressure, to the abutment 17 and to the central part 2a of the support 2, in the direction of the arrow 18, i.e., in a direction perpendicular to the plates 9 and 10 and to the axis of the fiber 15.

In the case where pressure is exerted on the external face of the membrane 16, as indicated by the arrows 19, a force is transmitted to the abutment 17, in the direction of the arrow 18, in such a manner as to cause deformation by bending of the central part 2a of the support 2 in the form of a beam, the ends of which are in abutment on the sensor body.

The deformation by bending of the central part 2a of the support 2 causes a relative movement of the end parts 2b and 2c, and thus of the elements 9 and 10 and of their sinusoidal active surfaces 9a and 10a. This relative movement involves a variation of the deformation by microcurvature of the fiber 15.

In the case shown in FIG. 1, bending of the support 2 in the form of a beam is manifested by a separation of the surfaces 9a and 10a, and thus by a reduction of the deformation of the fiber by microcurvature from its deformed condition obtained by the approach of the elements 9 and 10 towards each other.

The optical sensor 1 might likewise be employed to make a differential pressure measurement, by subjecting the membrane 16 to different pressures on its external face and internal faces.

Figure 3:
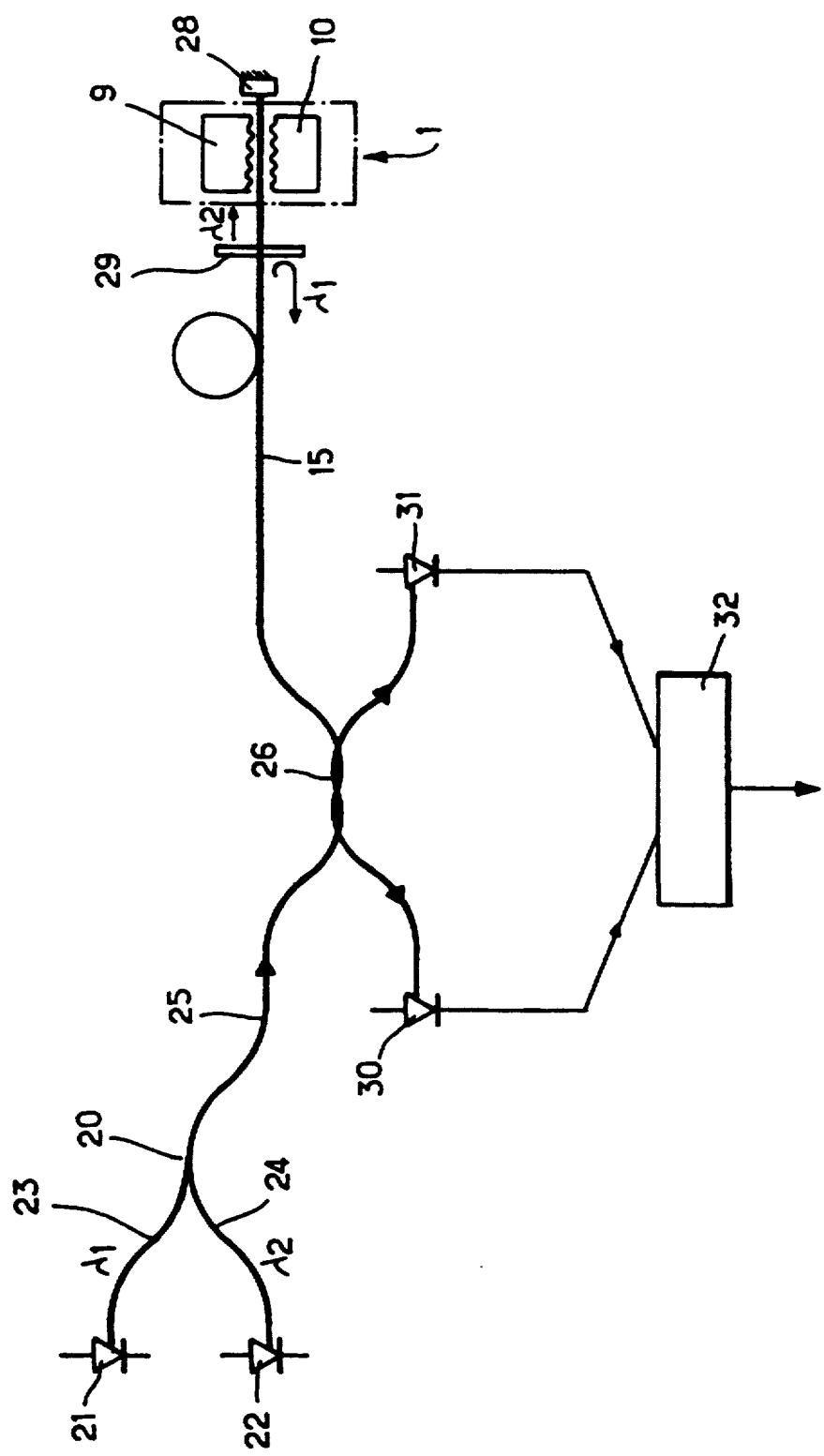
FIG. 3 is a schematic view of a sequential measurement system permitting the utilization of a sensor according to the invention.

FIG. 3 schematically shows a sequential measurement system permitting measurements to be made of attenuation of an optical radiation in an optical fiber such as the fiber 15 undergoing a deformation by microcurvatures between the movable elements 9, 10 of an optical sensor such as the sensor 1.

These attenuation measurements permit measurements to be made of a physical quantity such as pressure, the deformation by microcurvature of the fiber and thus its attenuation capacity being dependent upon the relative position of the movable elements with a sinusoidal active surface, which is itself dependent upon the value of the parameter to be measured.

The sequential measurement system includes two light-emitting diodes 21 and 22 which are adjusted to emit respectively an optical radiation of wavelength $\lambda 1$ into a first optical fiber 23 and an optical radiation of wavelength $\lambda 2$ into a second optical fiber 24, the optical fibers 23 and 24 being connected at a coupler 20. The exit of the coupler 20 is connected to an optical fiber 25 receiving a radiation constituted by the juxtaposition of the radiation of wavelength $\lambda 1$ and the radiation of wavelength $\lambda 2$. The fiber 25 is connected to a second coupler 26.

The optical sensor 1, which is constituted by a pressure sensor as described and shown in FIGS. 1 and 2, includes a multimode optical fiber 15 intercalated between the movable elements 9 and 10 of the sensor 1 at one of its ends and connected, at its other end, to the coupler 26. The end of the part of the fiber 15 intercalated between the movable elements 9 and 10 constitutes a reflecting mirror 28.

A dichroic filter 29 is likewise intercalated in the path of the fiber 15, at the entrance of the optical sensor 1. The dichroic filter 29 permits the transmission of the part of the optical radiation of wavelength $\lambda 2$ and the deflection by reflection of the part of the radiation of wavelength $\lambda 1$, in the optical fiber 15.

The coupler 26 includes four channels, which are connected respectively to the optical fiber 15, to the optical fiber 25 and to two optical fibers connected respectively to a photodiode 30 and to a photodiode 31 receiving optical signals and ensuring the conversion of these optical signals into electrical signals which are transmitted to a computer 32.

The optical signals originating from the light-emitting diodes 21 and 22 are transmitted directly by the coupler 26 to the photodiode 31, these signals being converted into electrical signals and processed by the computer in such a manner as to control the power emitted by the light-emitting diodes.

The signal constituted by the juxtaposition of the signals of wavelengths $\lambda 1$ and $\lambda 2$ is transmitted to the optical sensor 1 by the fiber 15.

The part of the signal of wavelength $\lambda 1$ is reflected by the dichroic filter 29 and transmitted to the photodiode 30, which permits the conversion of the optical signal into an electrical signal which is transmitted to the computer 32. It is thus possible to determine and to store the power or the intensity of the optical signal reflected prior to its entry into the optical sensor 1 and not affected by the microcurvatures of the fiber 15.

The part of the signal of wavelength λ2 penetrates into the optical sensor, propagates in the part of the fiber deformed by microcurvatures, and is then reflected into the fiber by the mirror 28. This part of the signal of wavelength λ2 is deflected by the mirror 28 into the fiber 15 and reaches the photodiode 30; this permits the determination and the storage of the power or the intensity of the attenuated signal within the optical sensor 1.

The attenuation of the optical signal is determined by the ratio of the power measured on the attenuated signal of wavelength λ2 to the power measured on the signal of wavelength λ2 reflected by the dichroic filter 29.

This gives a very accurate value of the attenuation, which is entirely independent of the optical characteristics of the sequential measurement system.

As explained hereinabove, this value of the attenuation is representative of a value of the measured physical quantity and, in the case of the sensor shown in FIGS. 1 and 2, of the pressure exerted by a fluid on the deformable membrane 16.

The pressure measurement may be performed in a sensitive manner and with a good reproducibility, provided that the sensor includes mechanical elements ensuring the transmission of the forces and causing the relative movement of the movable elements 9 and 10.

The cross-section of the central part 2a of the support 2 in the form of a beam may be adjusted in such a manner as to obtain a deformation of a desired amplitude under the effect of a given force exerted by the actuating rod of the sensor.

Moreover, the sensor may be constructed in a simple, compact and stable manner, in such a way as to be usable within the context of industrial measurements.

The support and the movable elements of the sensor may easily be inserted into and mounted in the body of an existing pressure sensor.

It should also be noted that the response of the optical sensor is not dependent upon the wavelength of the light source employed.

The optical sensors according to the invention are accordingly entirely suitable for an application in an installation where a large number of measurements are made with a color multiplexing of the measurement signals. Accordingly, these sensors may be employed advantageously on a wavelength-multiplexed network.

The support of the sensor may have a form other than that which has been described. The end parts of the support may include means for fixing and adjusting the movable elements which are different from those which have been described.

The sensor may likewise include an element other than a membrane on which a pressure is exerted, as means for the application of a bending force to the support in the form of a beam. This actuating means may be constituted by any device capable of transmitting a force to the central part of the support as a function of the values of a physical quantity to be measured.

The sensor according to the invention may be employed not only to make pressure measurements but also to make measurements of force, of strain or of any other physical or mechanical quantity, the variations of which may be manifested by variations of a force exerted on the support of the sensor.

We claim:

1. Optical sensor for measuring a physical parameter, said sensor comprising
   (a) a support in the form of a bending beam including two end parts bearing on two fixed abutments and a central part which is deformable by bending;
   (b) a bending component connected to said central part of said support which is actuated in an actuation direction for bending said central part as a function of a value of said physical parameter;
   (c) said end parts of said support being wider than said central part in the direction of actuation of said bending means and comprising two surfaces facing each other;
   (d) two recesses in said end parts emerging on the facing surfaces of said end parts;
   (e) two movable elements each having an active part in the form of a comb fixed each in a recess of one of said end parts and movable relative to each other as a function of the bending of said central part of said support;
   (f) an optical fiber fed with optical radiation disposed between the active parts of the two movable elements which come into contact with said fiber to produce reverse bending of said fiber as a function of the bending of said central part of said support; and
   (g) means for measuring the attenuation of the optical radiation in said fiber depending on the reverse bending of said fiber.

2. Optical sensor according to claim 1, wherein one of said movable elements is fixed in its recess by tightening a screw extending transversely to said recess, and the second movable element is slidably mounted in its recess in such a manner as to be capable of being moved in the direction of said first movable element by an adjusting screw engaged into a threaded hole situated in the extension of the recess of said second movable element.

* * * * *